(12) United States Patent
Szymanski

(10) Patent No.: US 11,006,745 B1
(45) Date of Patent: May 18, 2021

(54) ROTATABLE BOOK STAND SYSTEM

(71) Applicant: Douglas M. Szymanski, Spring Hill, FL (US)

(72) Inventor: Douglas M. Szymanski, Spring Hill, FL (US)

( * ) Notice: Subject to any disclaimer, the term of this patent is extended or adjusted under 35 U.S.C. 154(b) by 0 days.

(21) Appl. No.: 16/699,889

(22) Filed: Dec. 2, 2019

Related U.S. Application Data

(63) Continuation-in-part of application No. 14/249,485, filed on Apr. 10, 2014, now abandoned.

(51) Int. Cl.
| | |
|---|---|
| A47B 23/04 | (2006.01) |
| F16M 11/08 | (2006.01) |
| A47B 49/00 | (2006.01) |
| A47F 3/10 | (2006.01) |
| A47F 5/02 | (2006.01) |

(52) U.S. Cl.
CPC ........... *A47B 23/043* (2013.01); *F16M 11/08* (2013.01); *A47B 49/00* (2013.01); *A47F 3/10* (2013.01); *A47F 5/02* (2013.01)

(58) Field of Classification Search
CPC ..... A47B 23/043; A47B 49/00; A47B 23/042; F16M 11/08; A47F 5/02; A47F 3/10
USPC ................................................ 248/458, 441.1
See application file for complete search history.

(56) References Cited

U.S. PATENT DOCUMENTS

| | | | | | |
|---|---|---|---|---|---|
| 181,737 | A | * | 8/1876 | Smith ..................... | A47B 23/04 248/458 |
| 559,161 | A | * | 4/1896 | Brower .................. | A47B 49/00 108/103 |
| 888,158 | A | * | 5/1908 | Glass ..................... | A47B 23/04 248/458 |
| 1,169,869 | A | * | 2/1916 | Richards .............. | A47B 23/042 248/453 |
| 1,453,065 | A | * | 4/1923 | Fargo ..................... | B42F 17/02 29/237.5 |
| 1,488,282 | A | * | 3/1924 | Phillips .................. | A45D 33/26 132/294 |
| 1,812,318 | A | * | 6/1931 | Bower ..................... | A47F 7/02 211/37 |
| 2,144,856 | A | * | 1/1939 | Sawyer ................ | A47B 23/043 248/458 |

(Continued)

OTHER PUBLICATIONS http://www.shopbrodart.conn/supplies/display/specialty-displayers/_/Rotating-Book-Easel-with-Sign-Holder/ Han 10, 2010; Large Rotating Acrylic Book Easel with Sign Holder (Year: 2010).*

(Continued)

*Primary Examiner* — Ingrid M Weinhold
(74) *Attorney, Agent, or Firm* — GrayRobinson, P.A.; Michael J. Colitz, III

(57) ABSTRACT

A rotatable book stand has a lower base plate, an upper base plate, a roller bearing assembly, and a support member. The lower base plate has a first upper surface and a first lower surface. The upper base plate has a second upper surface and a second lower surface. The roller bearing assembly has a third upper surface and a third lower surface. The third upper surface is secured to the second lower surface. The third lower surface is secured to the first upper surface. The roller bearing assembly is in a circular configuration. The support member is attached to the second upper surface and is adapted to support a plurality of books.

1 Claim, 2 Drawing Sheets

(56) References Cited

U.S. PATENT DOCUMENTS

| | | | | |
|---|---|---|---|---|
| 3,599,925 A * | 8/1971 | Dubler | ............ | A47B 97/04 |
| | | | | 248/352 |
| 3,809,352 A * | 5/1974 | Mathias | ............ | A47B 23/042 |
| | | | | 248/444.1 |
| 3,850,487 A * | 11/1974 | Batchelor | ............ | A47F 5/04 |
| | | | | 312/249.2 |
| 4,190,303 A * | 2/1980 | Ellis | ............ | A47B 19/00 |
| | | | | 248/458 |
| D267,143 S * | 12/1982 | Gessing | ............ | D7/411 |
| 4,566,664 A * | 1/1986 | Donald | ............ | A47B 11/00 |
| | | | | 248/349.1 |
| 4,697,778 A * | 10/1987 | Harashima | ............ | A47B 11/00 |
| | | | | 108/103 |
| 4,919,383 A * | 4/1990 | Benjamin | ............ | A47F 5/02 |
| | | | | 248/349.1 |
| D347,451 S * | 5/1994 | Kazakowitz | ............ | D20/44 |
| D381,212 S * | 7/1997 | Pagano | ............ | D19/91 |
| 5,685,514 A * | 11/1997 | Carnahan | ............ | A47B 11/00 |
| | | | | 248/349.1 |
| 6,082,553 A * | 7/2000 | Stravitz | ............ | A47B 63/00 |
| | | | | 206/308.1 |
| 6,446,929 B1 * | 9/2002 | Scott | ............ | A47B 23/04 |
| | | | | 248/453 |
| 6,663,073 B1 * | 12/2003 | Church | ............ | A47B 97/08 |
| | | | | 248/458 |
| D526,357 S * | 8/2006 | Killinger | ............ | D19/90 |
| D591,973 S * | 5/2009 | Greiner | ............ | D6/663 |
| 9,657,895 B2 * | 5/2017 | Chen | ............ | F16M 13/022 |
| 9,677,704 B1 * | 6/2017 | Thelen | ............ | F16M 13/00 |
| 2002/0121585 A1 * | 9/2002 | Scott | ............ | A47B 23/04 |
| | | | | 248/458 |
| 2003/0234333 A1 * | 12/2003 | Kind | ............ | A47B 23/042 |
| | | | | 248/441.1 |
| 2007/0145868 A1 * | 6/2007 | Greiner | ............ | A47F 7/02 |
| | | | | 312/249.2 |
| 2016/0142523 A1 * | 5/2016 | Bartkowski | ............ | H04M 1/04 |
| | | | | 248/441.1 |
| 2016/0223126 A1 * | 8/2016 | Mireles | ............ | F16M 11/046 |

OTHER PUBLICATIONS https://www.alibaba.com/product-detail/Clear-Acrylic-Book-Holder-Acrylic-Plastic_580784219.html Jun 22, 2012; Clear Acrylic Book Holder Acrylic Plastic Book HOlder Stand Acrylic Two-Sided Book Holder (Year: 2012).*

* cited by examiner

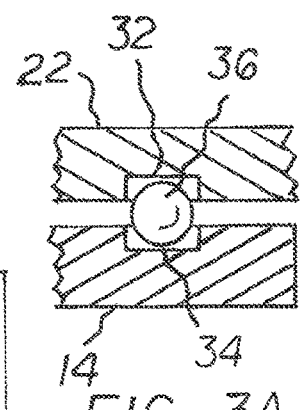
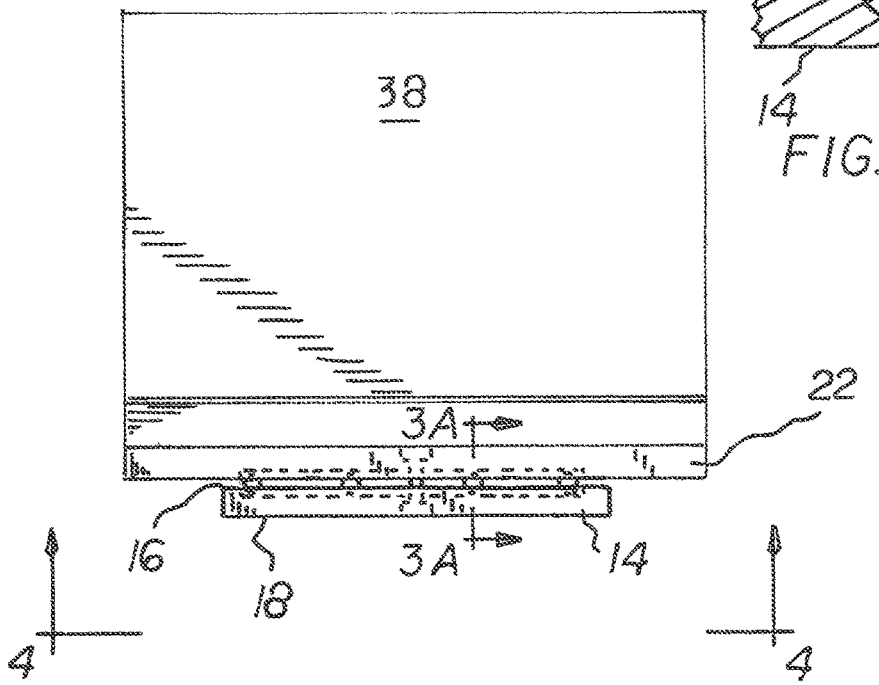
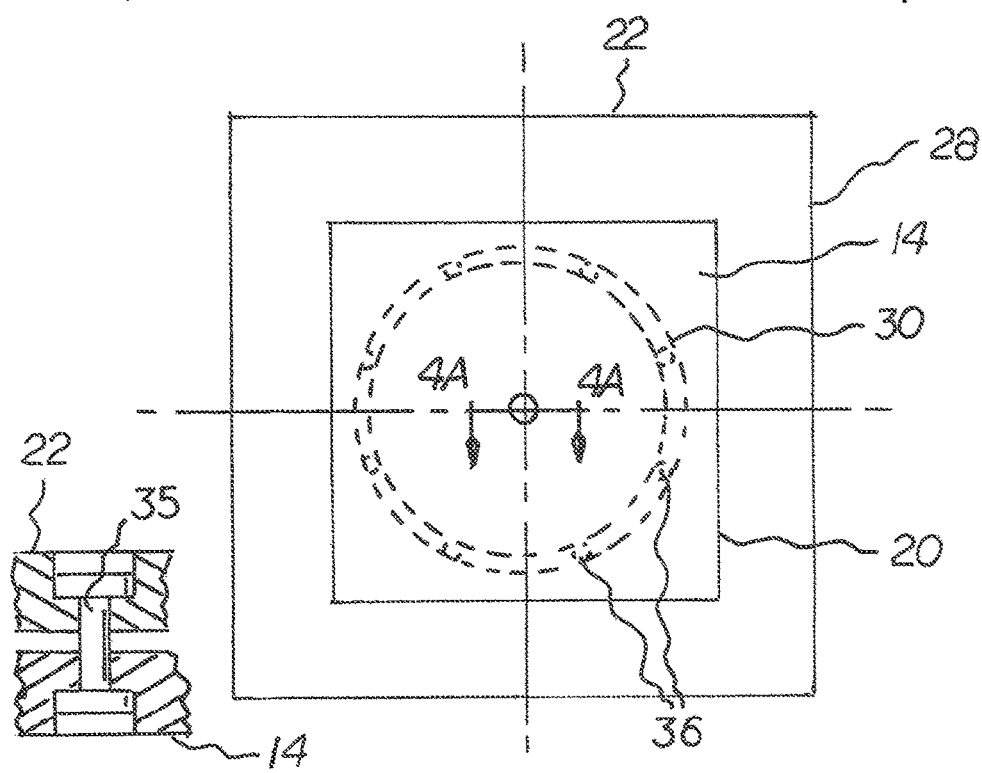

ROTATABLE BOOK STAND SYSTEM

RELATED APPLICATION

The present application is a continuation-in-part of application Ser. No. 14/249,485 filed Apr. 10, 2014, the priority Of which is claimed and the subject matter of which is incorporated herein by reference.

BACKGROUND OF THE INVENTION

Field of the Invention

The present invention relates to a rotatable book stand system and more particularly pertains to supporting a plurality of books in positions for reading and for repositioning the supported books through rotational movement, the supporting and repositioning of the books being done in a safe, convenient and economical manner.

SUMMARY OF THE INVENTION

In view of the foregoing disadvantages inherent in the types of book stands of known designs and configurations now present in the prior art, the present invention provides an improved rotatable book stand system. As such, the general purpose of the present invention, which will be described subsequently in greater detail, is to provide a new and improved rotatable book stand system and method which has all the advantages of the prior art and none of the disadvantages.

To attain this, the present invention essentially comprises a rotatable book stand having a lower base plate, an upper base plate, a roller bearing assembly, and a support member. The lower base plate has a first upper surface and a first lower surface. The upper base plate has a second upper surface and a second lower surface. The roller bearing assembly has a third upper surface and a third lower surface. The third upper surface is secured to the second lower surface. The third lower surface is secured to the first upper surface. The roller bearing assembly is in a circular configuration. The support member is attached to the second upper surface and is adapted to support a plurality of books.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved rotatable book stand system which has all of the advantages of the prior art book stands of known designs and configurations and none of the disadvantages.

It is another object of the present invention to provide a new and improved rotatable book stand system which may be easily and efficiently manufactured and marketed.

It is a further object of the present invention to provide a new and improved rotatable book stand system which is of durable and reliable constructions.

An even further object of the present invention is to provide a new and improved rotatable book stand system which is susceptible of a low cost of manufacture with regard to both materials and labor, and which accordingly is then susceptible of low prices of sale to the consuming public, thereby making such rotatable book stand system economically available to the buying public.

Lastly, another object of the present invention is to provide a rotatable book stand system for supporting a plurality of books in positions for reading and for repositioning the supported books through rotational movement, the supporting and repositioning of the books being done in a safe, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front elevational view of the system taken along line 2-2 of FIG. 1.

FIG. 3A is a cross sectional view taken along line 3A-3A of FIG. 3.

FIG. 4 is a bottom view of the system taken along line 4-4 of FIG. 3.

FIG. 4A is a cross sectional view taken along line 4A-4A of FIG. 4.

The same reference numerals refer to the same parts throughout the various Figures.

DESCRIPTION OF THE PREFERRED EMBODIMENT

Figure 1:
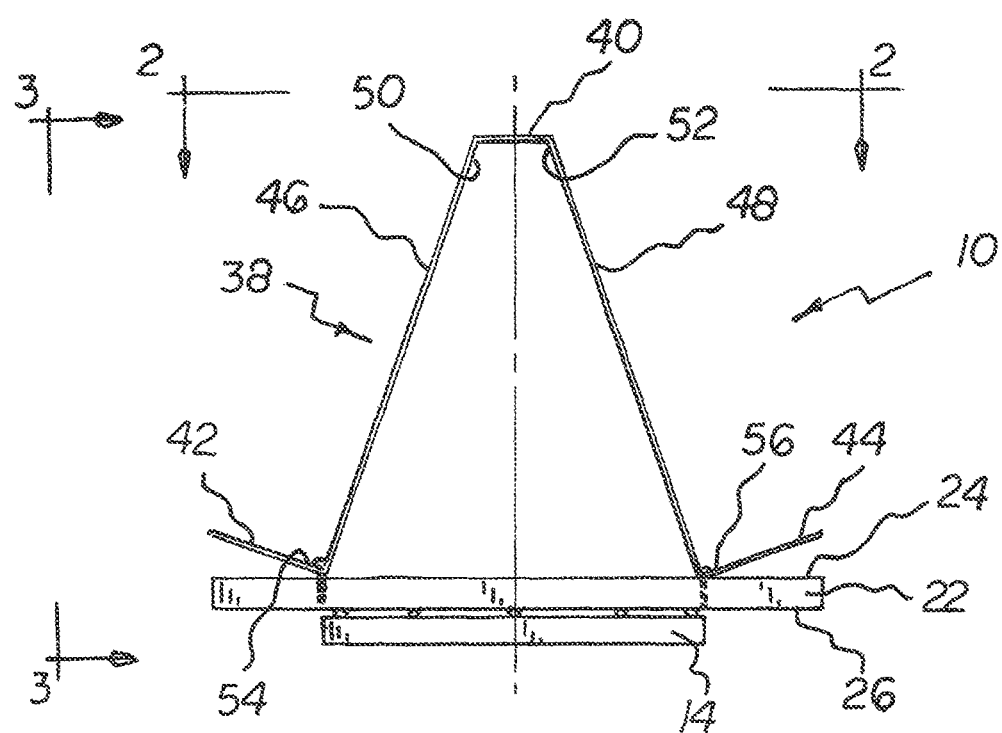
FIG. 1 is a side elevational view of a rotatable book stand system constructed in accordance with the principles of the present invention.
Figure 2:
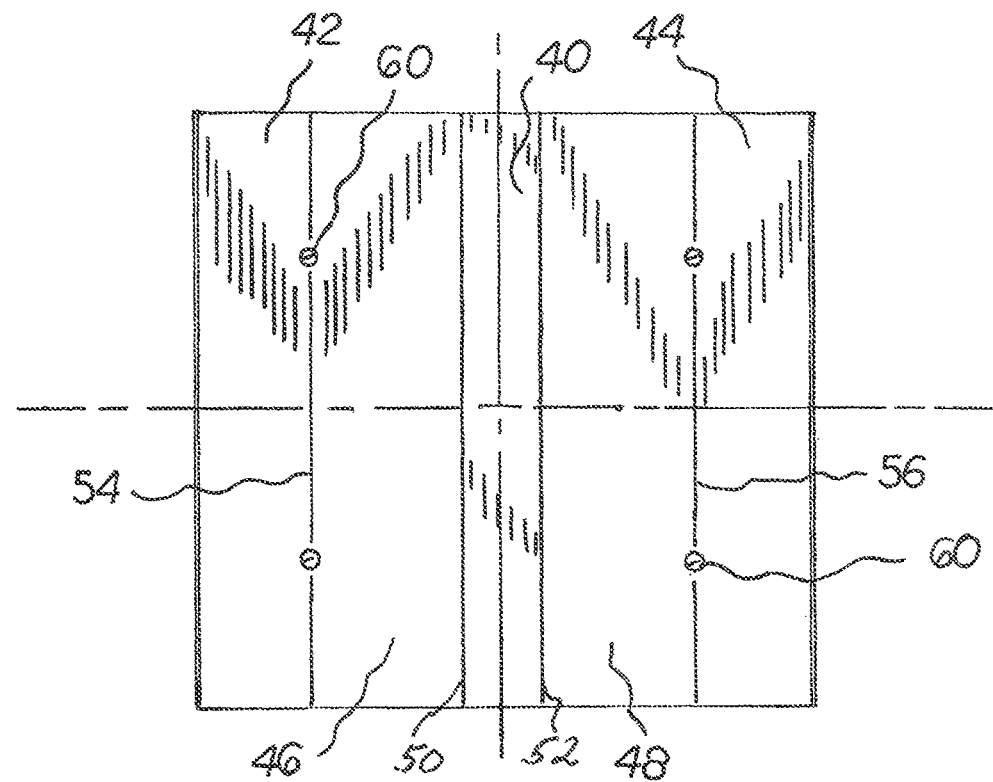
FIG. 2 is a plan view of the system taken along line 2-2 of FIG. 1.

With reference now to the drawings, and in particular to FIG. 1 thereof, the preferred embodiment of the new and improved rotatable book stand system embodying the principles and concepts of the present invention and generally designated by the reference numeral 10 will be described.

The present invention, the rotatable book stand system 10 is comprised of a plurality of components. Such components in their broadest context include a lower base plate, an upper base plate, a roller bearing assembly, and a support member. Such components are individually configured and correlated with respect to each other so as to attain the desired objective.

First provided is a lower base plate 14. The lower base plate is formed in a square configuration. The lower base plate has a first upper surface 16. The first upper surface is in a flat horizontal configuration. The first upper surface has a first lower surface 18. The first lower surface of the first upper surface is in a flat horizontal configuration. The lower base plate has lower edges 20. The first lower surface is positionable on a recipient surface. The lower base plate is from 7 inches to 8 inches on each side. The lower base plate has a thickness of from 0.5 inch and 1.0 inch. The lower base plate has a midpoint. The lower base plate is fabricated of a rigid material.

An upper base plate 22 is provided. The upper base plate is formed in a square configuration. The upper base plate has a second upper surface 24. The second upper surface is in a flat horizontal configuration. The second upper surface has a second lower surface 26. The second lower surface of the second upper surface is in a flat horizontal configuration. The upper base plate has upper edges 28. The second lower surface is positioned above the first upper surface. The upper base plate is from 11 inches to 13 inches on each side. The upper base plate has a thickness of from 0.5 inch and 1.0 inch. The upper base plate has a midpoint. The upper base plate is fabricated of a rigid material.

Provided next is a roller bearing assembly 30. The roller bearing assembly has a third upper surface 32. The third upper surface is secured to the second lower surface. The roller bearing assembly has a third lower surface 34. The third lower surface is secured to the first upper surface. The roller bearing assembly has a circular configuration. The roller bearing assembly has a midpoint. The midpoint is vertically aligned with the midpoint of the upper base plate and the midpoint of the lower base plate. A pivot pin 35 rotatably couples the upper base plate to the lower base plate. The roller bearing assembly has a diameter of from 7 inches to 9 inches. The roller bearing assembly has a plurality of spherical rollers 36 adapted to allow rotational movement of the upper base plate with respect to the lower base plate. The entire lower base plate always stays located beneath the upper base plate.

The upper base plate has an area between 80 percent and 90 percent greater than the lower base plate which has been found to provide maximum stability during use.

Further provided is a support member 38. The support member is fabricated of a single sheet of metal. The support member has a horizontal top section 40. The support member also has primary and secondary short bottom sections 42, 44 and primary and secondary long intermediate sections 46, 48. The support member has a horizontal centerline extending there through. The top section has a length of from 1 to 2 inches. The short bottom sections have lengths of from 2 to 3 inches. The long intermediate sections have lengths of from 9 to 10 inches. The support member forms upper junctures 50, 52. In this manner obtuse angles are formed between the top section and the long intermediate sections. The support member forms lower junctures 54, 56. In this manner 90 degree angles are formed between the short bottom sections and the long intermediate sections. Each lower junction has opposed lower ends. The upper junctures are parallel with and equally spaced from the midpoint of the roller bearing assembly. The lower junctures are parallel with and equally spaced from the midpoint of the roller bearing assembly. The long intermediate sections are between 15 and 20 degrees from the vertical. The support member is adapted to support a first book in contact with the primary long intermediate section and the primary short bottom section. The support member is further adapted to support a second book in contact with the secondary long intermediate section and the secondary short bottom section.

Provided last are fasteners 60. The fasteners extend through the lower junctures coupling the support member to the upper base plate at locations equally spaced from the centerline and the opposed lower ends of each lower junction.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A rotatable book stand system (10) for supporting a plurality of books in positions for reading and for repositioning the supported books through rotational movement, the system consisting of, in combination:

a lower base plate (14), the lower base plate being formed in a square configuration and having a first upper surface (16) in a flat and horizontal configuration and having a first lower surface (18) in a flat and horizontal configuration, the lower base plate having four perimeter lower edges (20), the first lower surface being positionable on a recipient surface, the lower base plate being from 7 inches to 8 inches on each full length of a side, the lower base plate having a thickness of from 0.5 inch to 1.0 inch, the lower base plate having a midpoint, the lower base plate being fabricated of a rigid material;

an upper base plate (22), the upper base plate being formed in a square configuration and having a second upper surface (24) in a flat and horizontal configuration, the upper base plate having a second lower surface (26) in a flat and horizontal configuration, the upper base plate having four perimeter upper edges (28), the second lower surface being positioned above the first upper surface, the upper base plate being from 11 inches to 13 inches on each full length of a side, the upper base plate having a thickness of from 0.5 inch to 1.0 inch, the upper base plate having a midpoint, the upper base plate being fabricated of a rigid material;

a roller bearing assembly (30) having a third upper surface (32) recessed upwardly in the second lower surface, the roller bearing assembly having a third lower surface (34) recessed downwardly in the first upper surface, the roller bearing assembly having a circular configuration with a midpoint vertically aligned with the midpoint of the upper base plate and the midpoint of the lower base plate, a pivot pin (35) rotatably coupling the upper base plate to the lower base plate, the roller bearing assembly having a diameter of from 7 inches to 9 inches, the roller bearing assembly having plural spherical rollers (36) adapted to allow rotational movement of the upper base plate with respect to the lower base plate with the entire lower base plate always located beneath the upper base plate;

a support member (38) fabricated of a single sheet of metal, the support member having sections, the sections being a horizontal top section (40) and primary and secondary short bottom sections (42), (44) and primary and secondary long intermediate sections (46), (48), the support member having a same width along its entire length and the sections being of different lengths, the horizontal top section (40) having a length of from 1 to 2 inches, the short bottom sections (42), (44) having a length of from 2 to 3 inches, the long intermediate sections (46), (48) having a length of from 9 to 10 inches, the support member forming upper junctures (50), (52) with obtuse angles between the horizontal top section and the long intermediate sections, the support member forming lower junctures (54), (56) with 90 degree angles between the short bottom sections and the long intermediate sections, the upper junctures being parallel, the lower junctures being parallel, the long intermediate sections (46) (48) positioned at an angle between 15 and 20 degrees from vertical, the support member adapted to support a first book in contact with the primary long intermediate section and the primary short bottom section, the support member adapted to support a second book in contact with the secondary long intermediate section and the secondary short bottom section; and fasteners (60) extending through the lower junctures coupling the support member to the upper base plate at locations equally spaced from the mid point of the upper base plate.

\* \* \* \* \*